United States Patent
Ichikawa et al.

(10) Patent No.: US 12,169,906 B2
(45) Date of Patent: Dec. 17, 2024

(54) INFORMATION PROCESSING APPARATUS, INFORMATION PROCESSING METHOD, AND PROGRAM

(71) Applicant: Sony Group Corporation, Tokyo (JP)

(72) Inventors: Miwa Ichikawa, Tokyo (JP); Daisuke Tajima, Tokyo (JP); Tsuyoshi Ishikawa, Kanagawa (JP); Keijiroh Nagano, Tokyo (JP); Shin Shiroma, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/568,110

(22) PCT Filed: Jan. 28, 2022

(86) PCT No.: PCT/JP2022/003202
§ 371 (c)(1),
(2) Date: Dec. 7, 2023

(87) PCT Pub. No.: WO2023/276216
PCT Pub. Date: Jan. 5, 2023

(65) Prior Publication Data
US 2024/0212293 A1 Jun. 27, 2024

(30) Foreign Application Priority Data
Jun. 29, 2021 (JP) .................. 2021-108086

(51) Int. Cl.
*G06T 19/00* (2011.01)
*G06F 3/01* (2006.01)

(52) U.S. Cl.
CPC ............ *G06T 19/006* (2013.01); *G06F 3/012* (2013.01)

(58) Field of Classification Search
None
See application file for complete search history.

(56) References Cited

U.S. PATENT DOCUMENTS

| | | | |
|---|---|---|---|
| 2017/0140552 A1* | 5/2017 | Woo | G06F 3/0304 |
| 2018/0348986 A1* | 12/2018 | Sawaki | G06F 3/0304 |
| 2020/0167003 A1* | 5/2020 | Nonomura | G06T 7/70 |
| 2022/0409991 A1* | 12/2022 | Ohashi | A63F 13/26 |

FOREIGN PATENT DOCUMENTS

| | | |
|---|---|---|
| JP | 2010-534895 A | 11/2010 |
| JP | 2017-182216 A | 10/2017 |
| JP | 2018-205913 A | 12/2018 |

(Continued)

*Primary Examiner* — Christopher J Kohlman
(74) *Attorney, Agent, or Firm* — Paratus Law Group, PLLC

(57) ABSTRACT

An information processing apparatus includes a position processing unit, a correction unit, and a display control unit. The position processing unit estimates a head position of a user and estimates a position of a predetermined part of a body of the user based on the estimated head position. The correction unit corrects the position of the predetermined part estimated by the position processing unit based on the head position and an angle of inclination of a head of the user. The display control unit executes processing of displaying an image operated by the user to be overlapped with a space visually recognized by the user based on the position corrected by the correction unit.

10 Claims, 12 Drawing Sheets

(56) References Cited

FOREIGN PATENT DOCUMENTS

| JP | 2019-101468 A | 6/2019 |
|----|---------------|--------|
| JP | 2020-003898 A | 1/2020 |
| JP | 2020-107123 A | 7/2020 |
| WO | WO 2019/038875 A1 | 2/2019 |

* cited by examiner (a)  (b)

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2022/003202 (filed on Jan. 28, 2022) under 35 U.S.C. § 371, which claims priority to Japanese Patent Application No. 2021-108086 (filed on Jun. 29, 2021), which are all hereby incorporated by reference in their entirety.

FIELD

The present invention relates to an information processing apparatus, an information processing method, and a program.

BACKGROUND

As an invention for determining contact with an object in a virtual space, for example, there is an information processing apparatus disclosed in Patent Literature 1. This information processing apparatus specifies the length of an arm of a user and sets a range that a collision region of the object can reach by the collision region set in the object of an avatar of the user and a range in which the user can move a hand. Since the range that the collision region of the object can reach is set according to the length of the arm of the user, the range that the collision region can reach is a predetermined range even when the user is changed.

CITATION LIST

Patent Literature

Patent Literature 1: JP 2019-101468 A

SUMMARY

Technical Problem

In the virtual space, for example, a graphical user interface (GUI) for displaying information may be operated. A user corresponding to an avatar may squat in a space or incline the head, and a range in which a hand of the avatar can reach changes depending on the posture of the user, and operability deteriorates, whereby usability is likely to be deteriorated.

Therefore, the present disclosure proposes an information processing apparatus, an information processing method, and a program capable of suppressing deterioration in usability.

Solution to Problem

According to the present disclosure, an information processing apparatus is provided that includes: a position processing unit that estimates a head position of a user and estimates a position of a predetermined part of a body of the user based on the estimated head position; a correction unit that corrects the position of the predetermined part estimated by the position processing unit based on the head position and an angle of inclination of a head of the user; and a display control unit that executes processing of displaying an image operated by the user to be overlapped with a space visually recognized by the user based on the position corrected by the correction unit.

DESCRIPTION OF EMBODIMENTS

Figure 1:
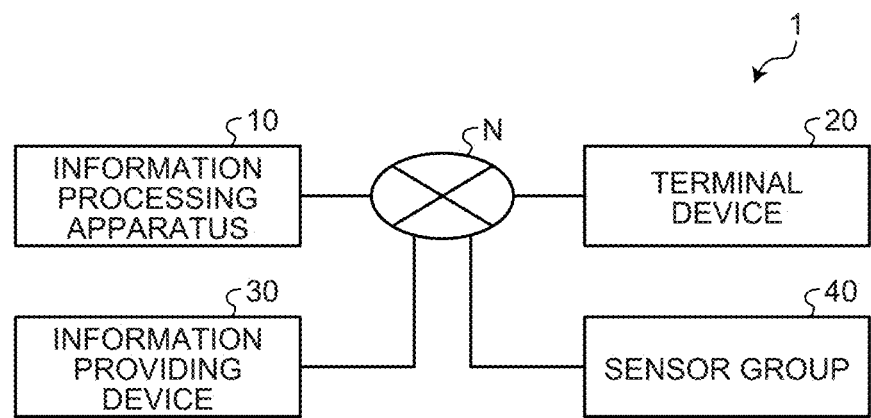
FIG. 1 is a diagram illustrating an apparatus that configures an information processing system according to an embodiment.

Hereinafter, preferred embodiments of the present disclosure are described in detail with reference to the accompanying drawings. Note that, in the present specification and the drawings, a component having substantially the same functional configuration is denoted by the same reference numeral, and overlapping description is omitted.

Note that the description is given in the following order.
1. Summary of Embodiments of Present Disclosure
   1.1. Introduction
   1.2. Summary of Information Processing System
2. Embodiment of Information Processing System
   2.1. AR Display in Work Place of Field
   2.2. Method of Specifying Position of Waist of User
   2.3. Display Mode of Operation Button
3. Configuration of Information Processing System
   3.1. Configuration of Information Processing Apparatus
   3.2. Configuration of Terminal Device
   3.3. Configuration of Information Providing Device
   3.4. Processing of Information Processing System
   3.5. Variations of Processing
4. Hardware Configuration Example
5. Conclusion

1. Summary of Embodiments of Present Disclosure

1.1. Introduction

In Synecoculture (registered trademark), attention has been paid to a technique of visualizing and displaying various types of information (for example, sunlight amount and soil moisture amount) related to an ecosystem of a plant or the like in a field to a worker by using augmented reality (AR) technology. As a method of displaying various types of information, for example, there is a method of performing AR display of a GUI such as a button for displaying information on a terminal device and operating the displayed GUI.

When the display position of the GUI is fixed in the three-dimensional space, the GUI is positioned outside the field of view when the worker moves the line of sight or moves in the three-dimensional space. In this case, in order to operate the GUI, it is necessary to first search for the GUI moved out of the field of view, and it takes time and effort to search for the GUI.

Therefore, the present disclosure proposes an information processing apparatus, an information processing method, and a program with good operability.

In the following description, the worker in the field is appropriately referred to as a "user". The user may be a user who experiences as a worker in the field with AR. In an embodiment, the user is a worker in an actual field.

1.2. Summary of Information Processing System

A summary of an information processing system 1 according to the embodiment is described. FIG. 1 is a diagram illustrating an apparatus that configures the information processing system 1. As illustrated in FIG. 1, the information processing system 1 includes an information processing apparatus 10, a terminal device 20, an information providing device 30, and a sensor group 40. For example, the information processing apparatus 10 is connected to a communication line N by wire but may be connected wirelessly. Various devices can be connected to the information processing apparatus 10. For example, the terminal device 20 and the information providing device 30 are connected to the information processing apparatus 10 via the communication line N, and information cooperation is performed between the devices. In addition, the terminal device 20, the information providing device 30, and the sensor group 40 are also connected to the communication line N by wire or wirelessly. The wireless connection of the terminal device 20, the information providing device 30, and the sensor group 40 to the communication line N is, for example, connection via a wireless LAN, but is not limited to the wireless LAN, and may be, for example, connection using the Bluetooth (registered trademark).

The terminal device 20 is, for example, an optical see-through type head mounted display capable of AR display such as HoloLens (registered trademark) or HoloLens 2. Furthermore, the terminal device 20 may be a terminal device such as a smartphone capable of performing AR display using ARCore (registered trademark), ARKit (registered trademark), or the like. Furthermore, the terminal device 20 may be a video see-through type AR device or an XR device such as the XR-1 of Varjo (registered trademark). Furthermore, the terminal device 20 may be a VR device such as a head mounted display capable of VR display. The terminal device 20 sets a range that can be visually recognized by the user via the terminal device 20 as a target range and performs AR display of various types of information related to the target range visually recognized in the field, for example, based on visualization information provided from the information processing apparatus 10. Note that the terminal device 20 is an example of an information processing apparatus in the present disclosure.

The sensor group 40 includes, for example, sensors that measure various types of information related to the field, such as a camera that photographs the field, a sensor that measures the sunlight amount of the field, and a sensor that measures a soil moisture amount of the field.

The information providing device 30 is an information processing apparatus that provides the various types of information related to the target range to the information processing apparatus 10. For example, the information providing device 30 acquires and stores various types of information such as a sunlight amount, a soil moisture amount, and a video of the field from the sensor group 40 installed in the field. The information providing device 30 provides the various types of information related to the stored target range to the information processing apparatus 10 in response to a request. The information providing device 30 is implemented by a personal computer (PC), a work station (WS), or the like. Note that the information providing device 30 is not limited to a PC, a WS, or the like.

The information processing apparatus 10 is an information processing apparatus that executes processing for providing the terminal device 20 with information to be subjected to AR display in the terminal device 20. Specifically, the information processing apparatus 10 acquires sensor information to be described below from the terminal device 20. The information processing apparatus 10 requests the information providing device 30 for various types of information such as the sunlight amount and the soil moisture amount in the target range specified using the acquired sensor information and acquires various types of information supplied in response to the request. Then, the information processing apparatus 10 provides visualization information for displaying the sunlight amount and the soil moisture amount for the target range based on the information acquired from the information providing device 30. The information processing apparatus 10 is implemented by a PC, a WS, or the like. Note that the information processing apparatus 10 is not limited to the PC, the WS, or the like. For example, the information processing apparatus 10 may be an information processing apparatus such as a PC or a WS onto which a function as the information processing apparatus 10 is mounted as an application.

2. Embodiment of Information Processing System

Next, an embodiment of the information processing system 1 is described. Note that, in the embodiment, it is assumed that the user wears the terminal device 20 which is a see-through type head mounted display. In addition, in the embodiment, it is assumed that there is a work place in the field.

2.1. AR Display in Work Place of Field

Figure 2:
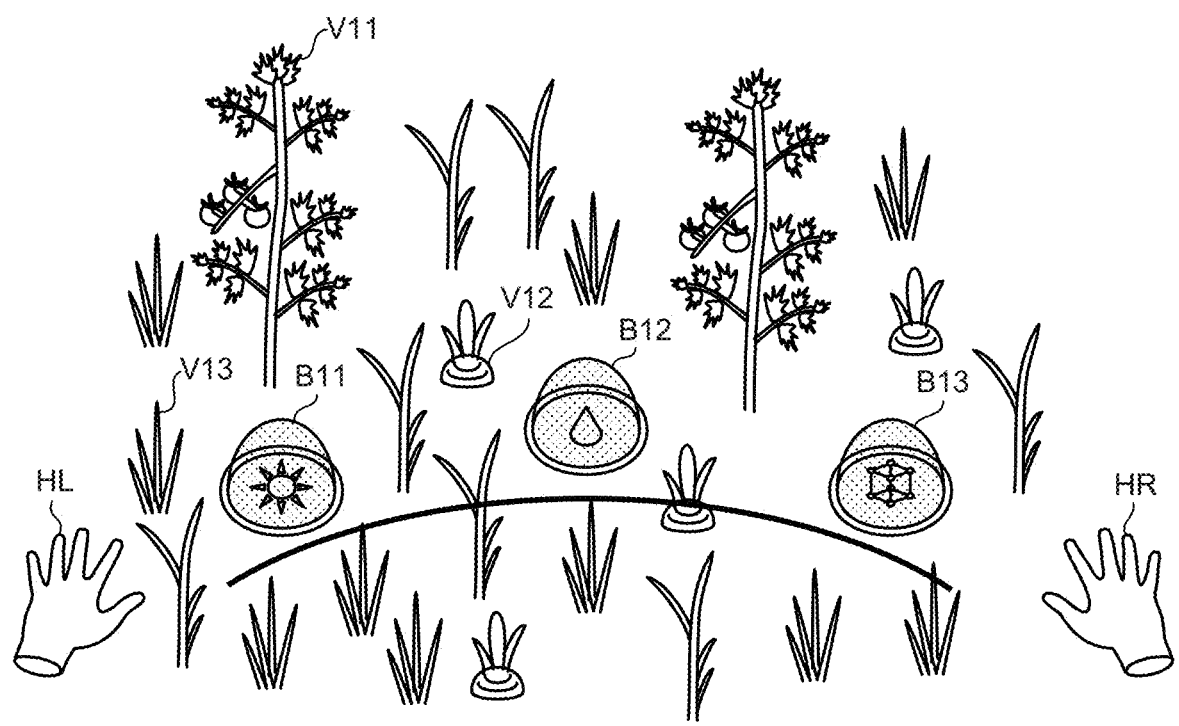
FIG. 2 is a diagram illustrating an example of a work place and a GUI visually recognized by a user via a terminal device.

FIG. 2 is a diagram illustrating an example of a work place visually recognized by the user via the terminal device 20 and a GUI displayed as AR which is displayed on the terminal device 20 and visually recognized by the user. As illustrated in FIG. 2, vegetation visually recognized by the user at the work place includes tomatoes V11, ginseng V12, Chinese chive V13, and the like. In addition, the AR display visually recognized by the user includes operation buttons B11 to B13 which are examples of GUIs, a virtual hand HL which is a virtual object visualizing the left hand of the worker sensed by the terminal device 20, and a virtual hand HR which is a virtual object visualizing a right hand of the worker sensed by the terminal device 20.

The operation buttons B11 to B13 are displayed on the basis of the position of the waist of the user. The operation button B11 is a button for controlling AR display of information on the sunlight amount in the work place. The operation button B12 is a button for controlling AR display of the soil moisture amount at the work place. The operation button B13 is a button for controlling the AR display of the complexity of the vegetation of the work place.

2.2. Method of Specifying Position of Waist of User

Figure 3:
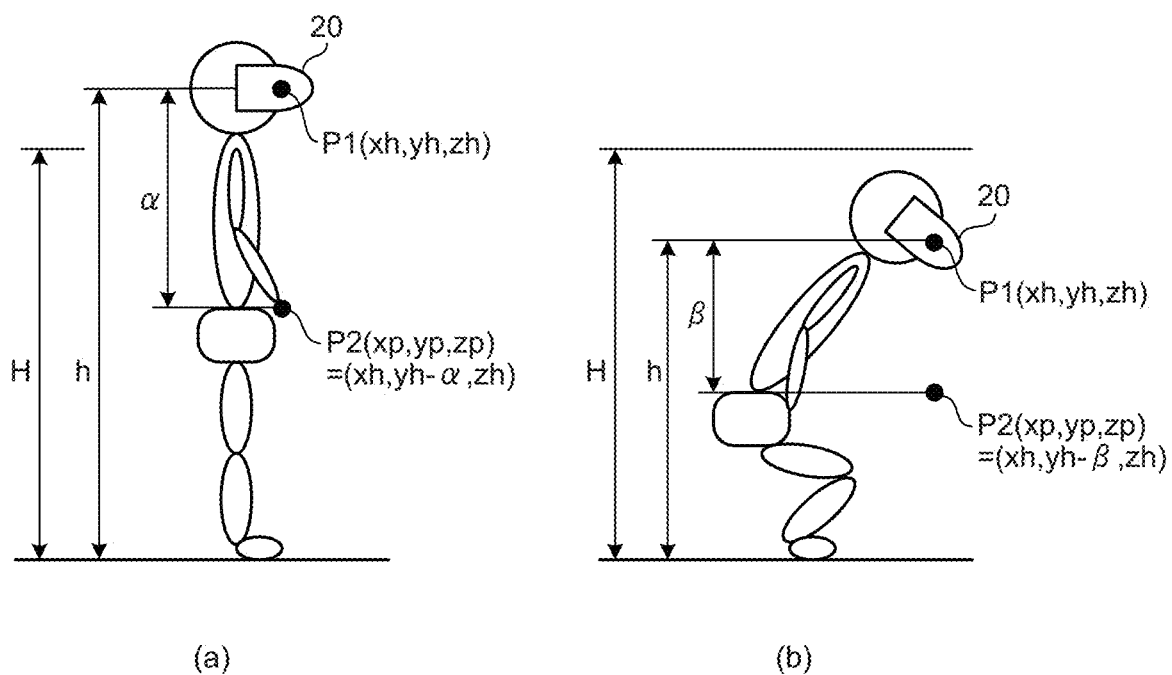
FIG. 3 is diagrams illustrating a method of calculating a position of a waist of the user.

FIG. 3 is a diagram illustrating a method of calculating a position of the waist of the user. For example, the terminal device 20 senses a relative position from coordinates (0, 0, 0) of an origin in a left-handed three-dimensional orthogonal coordinate system in which a position predetermined in the field is set as the origin and sets coordinates of a head position P1, which is the sensed position, as head coordinates (xh, yh, zh) of the user.

The terminal device 20 specifies coordinates (xp, yp, zp) of a waist position P2 of the user based on the head position P1. As illustrated in FIG. 3(a), for example, in a case where a height h in the vertical direction from the ground where the origin of the field is located to the head position P1 is higher than a threshold H which is a predetermined reference height, the terminal device 20 sets the waist position P2 of the user to a position lower by a distance α from the head position P1 to the waist. In a case where the coordinates of the head position P1 are (xh, yh, zh), the coordinates (xp, yp, zp) of the waist position P2 in this case are (xh, yh-α, zh). The distance α may be a distance based on a predetermined human body model or may be a distance obtained by measuring in advance the distance from the position of the head to the waist when the user stands upright.

Meanwhile, for example, as illustrated in FIG. 3(b), in a case where the user takes a squatting posture and the height h in the vertical direction from the ground where the origin of the field is located to the head position P1 is equal to or less than a predetermined threshold H, the terminal device 20 sets the waist position P2 of the user to a position lower by a distance β from the head position P1. The distance β is shorter than the distance ct. In a case where the coordinates of the head position P1 are (xh, yh, zh), the coordinates (xp, yp, zp) of the waist position P2 in this case are (xh, yh-β, zh).

Figure 4:
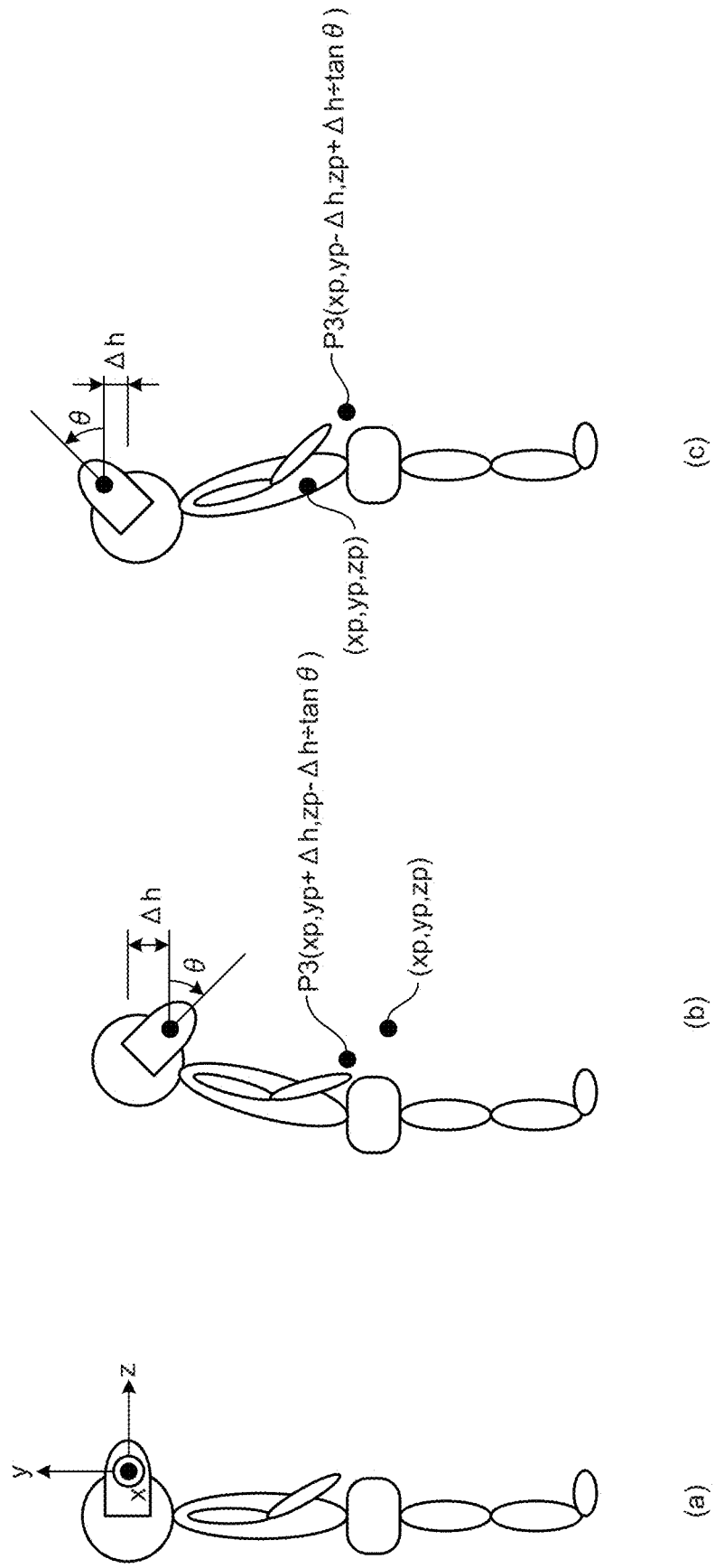
FIG. 4 is diagrams illustrating a method of correcting a position of the waist of the user.

The terminal device 20 that specifies the waist position P2 corrects the waist position P2 of the user according to the inclination of the terminal device 20. FIG. 4 is a diagram illustrating a method of correcting the waist position P2 of the user. The terminal device 20 sets the left-handed three-dimensional orthogonal coordinate system with head coordinates as an origin. The terminal device 20 corrects the waist position P2 of the user in a case where an angle θ of the inclination (pitch) about the x-axis of the left-handed three-dimensional orthogonal coordinate system with the head coordinates as the origin is not within the predetermined range.

FIG. 4(a) illustrates a state in which the terminal device 20 is not rotated about the x-axis of the left-handed three-dimensional orthogonal coordinate system with the head coordinates as the origin when the user is in the standing state. The terminal device 20 senses the angle θ of the inclination of the terminal device 20 about the x-axis from the horizontal state illustrated in FIG. 4(a) and a movement distance Δh of the head position P1 from the standing state in the vertical direction.

For example, in a case where the terminal device 20 is inclined downward beyond a predetermined range as illustrated in FIG. 4(b), and coordinates of the waist position before correction are (xp, yp, zp) in the left-handed three-dimensional orthogonal coordinate system with head coordinates as the origin, the terminal device calculates coordinates of the waist position after correction by Expressions (1) to (3) below.

$$xp \text{ after correction} = xp \text{ before correction} \quad (1)$$

$$yp \text{ after correction} = yp \text{ before correction} + \Delta h \quad (2)$$

$$zp \text{ after correction} = zp \text{ before correction} - \Delta h \div \tan\theta \quad (3)$$

Furthermore, for example, in a case where the terminal device 20 inclines upward beyond a predetermined range as illustrated in FIG. 4(c), and the coordinates of the waist position before correction are (xp, yp, zp), the terminal device calculates the coordinates of the waist position after correction by Expressions (4) to (6).

$$xp \text{ after correction} = xp \text{ before correction} \quad (4)$$

$$yp \text{ after correction} = yp \text{ before correction} - \Delta h \quad (5)$$

$$zp \text{ after correction} = zp \text{ before correction} + \Delta h \div \tan\theta \quad (6)$$

The terminal device 20 displays the operation buttons B11 to B13 based on a waist position P3 after correction in the left-handed three-dimensional orthogonal coordinate system with the head position P1 as the origin. For example, the terminal device 20 displays the operation button B12 at the waist position P3 after correction. In addition, the terminal device 20 displays the operation button B11 and the operation button B13 at positions offset from the waist position P3 in the x-axis direction and the z-axis direction by a predetermined offset in the left-handed three-dimensional orthogonal coordinate system with the head position P1 as the origin. As a result, as illustrated in FIG. 2, the operation buttons B11 to B13 are displayed as AR in the field of view of the user. The user operates the operation buttons B11 to B13 displayed as AR with the virtual hand HL or the virtual hand HR. The display modes of the operation buttons B11 to B13 are changed according to the operation by the virtual hand HL or the virtual hand HR.

2.3. Display Mode of Operation Button

Figure 5:
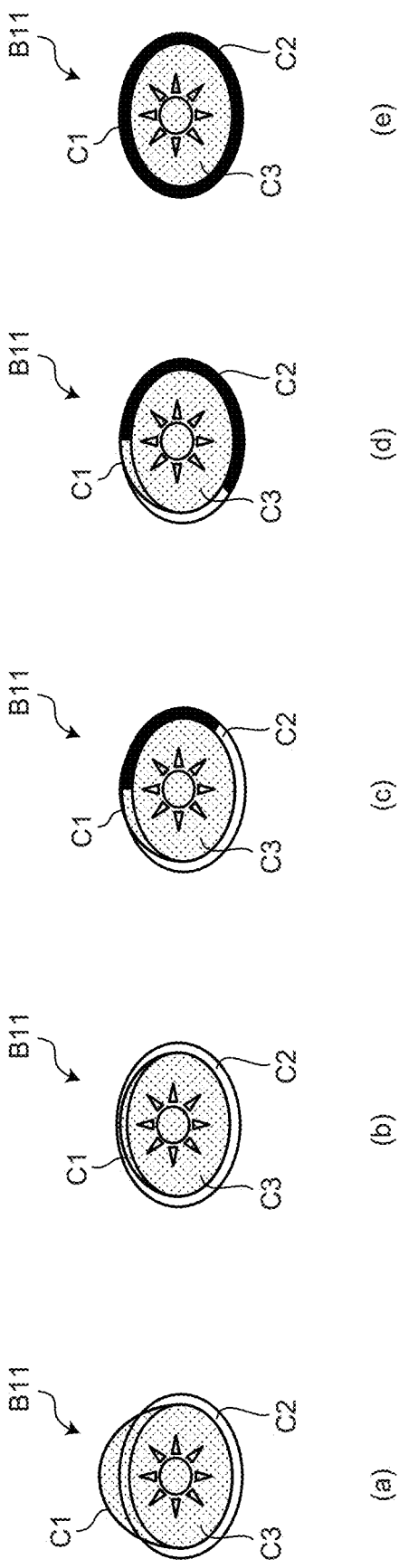
FIG. 5 is diagrams illustrating an example of display modes of an operation button according to the embodiment.

FIG. 5 is a diagram illustrating an example of a display mode of the operation button B11. The operation button B11 includes an operated portion C1 having a transparent hemispherical shape, an indicator portion C2 having an annular shape, and a function display portion C3 including an icon representing a function corresponding to the operation button B11.

The terminal device 20 determines whether the virtual hand HL or the virtual hand HR is in contact with the operated portion C1. When determining that the virtual hand HL or the virtual hand HR is not in contact with the operated portion C1, the terminal device 20 displays the operated portion C1 in a hemispherical shape as illustrated in FIG. 5(a).

When determining that the virtual hand HL or the virtual hand HR is in contact with the operated portion C1, the terminal device 20 displays the height of the operated portion C1 to be lower than the state illustrated in FIG. 5(a). The terminal device 20 changes the display of the indicator portion C2 according to the contact time of the virtual hand HL or the virtual hand HR with the operated portion C1. Specifically, the terminal device 20 clockwise changes the color of the indicator portion C2 according to the contact time of the virtual hand HL or the virtual hand HR with the operated portion C1. As a result, the color of the indicator portion C2 is clockwise changed as illustrated in FIGS. 5(c) and 5(d) according to the increase in the contact time. When the contact time of the virtual hand HL or the virtual hand HR with the operated portion C1 exceeds a predetermined threshold T, the terminal device 20 changes the color of the indicator portion C2 over the entire circumference as illustrated in FIG. 5(e). In a case where the virtual hand HL or the virtual hand HR is separated from the operated portion C1 before the contact time reaches the threshold T, the terminal device 20 returns the display of the operation button B11 to the state illustrated in FIG. 5(a).

Figure 6:
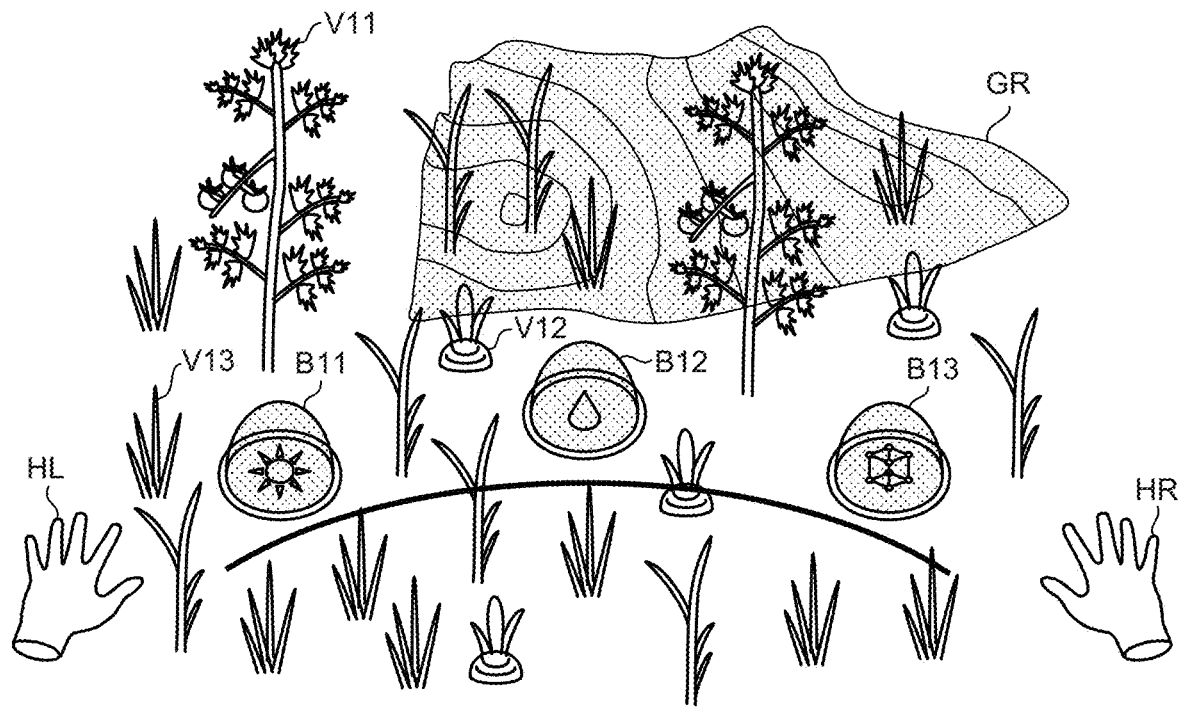
FIG. 6 is a diagram illustrating an example of the work place and the GUI visually recognized by the user via the terminal device.

In a case where the contact time of the virtual hand HL or the virtual hand HR with the operated portion C1 is equal to or longer than the threshold T, the terminal device 20 executes processing corresponding to the button in contact with the virtual hand HL or the virtual hand HR. For example, in a case where the time during which the virtual hand HL or the virtual hand HR is in contact with the operated portion C1 of the operation button B11 is equal to or longer than the threshold T, the terminal device 20 requests the information processing apparatus 10 to provide visualization information of the sunlight amount in the target range visually recognized by the user. The terminal device 20 displays a graph GR of the sunlight amount as AR as illustrated in FIG. 6 based on the visualization information transmitted from the information processing apparatus 10.

Note that, in a case where the terminal device 20 determines that the virtual hand HL or the virtual hand HR is in contact with the operated portion C1, the height of the operated portion C1 may not be displayed to be lower than that in a state where the virtual hand HL or the virtual hand HR is not in contact with the operated portion C1 but may be displayed to be in another display mode.

Figure 7:
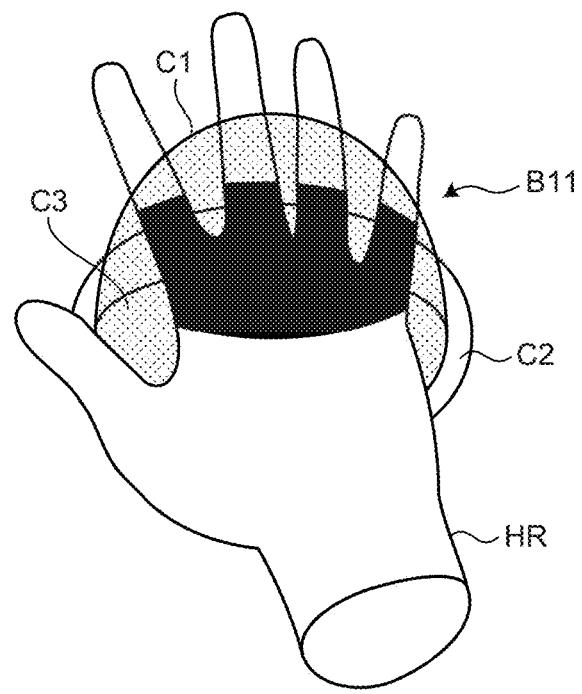
FIG. 7 is a diagram illustrating an example of a display mode of the operation button and a virtual hand according to the embodiment.

FIG. 7 is a diagram illustrating an example of a display mode of the operation button B11 when a part of the virtual hand HR is positioned in the operation button B11. The terminal device 20 specifies a region positioned in the operated portion C1 in the virtual hand HL or the virtual hand HR based on the position of the virtual hand HL or the virtual hand HR and the display position of the operation button B11. The terminal device 20 may display the specified region in a color different from that of the region outside the operated portion C1 as illustrated in FIG. 7.

3. Configuration of Information Processing System

Next, a configuration of the information processing system 1 is described.

3.1. Configuration of Information Processing Apparatus

Figure 8:
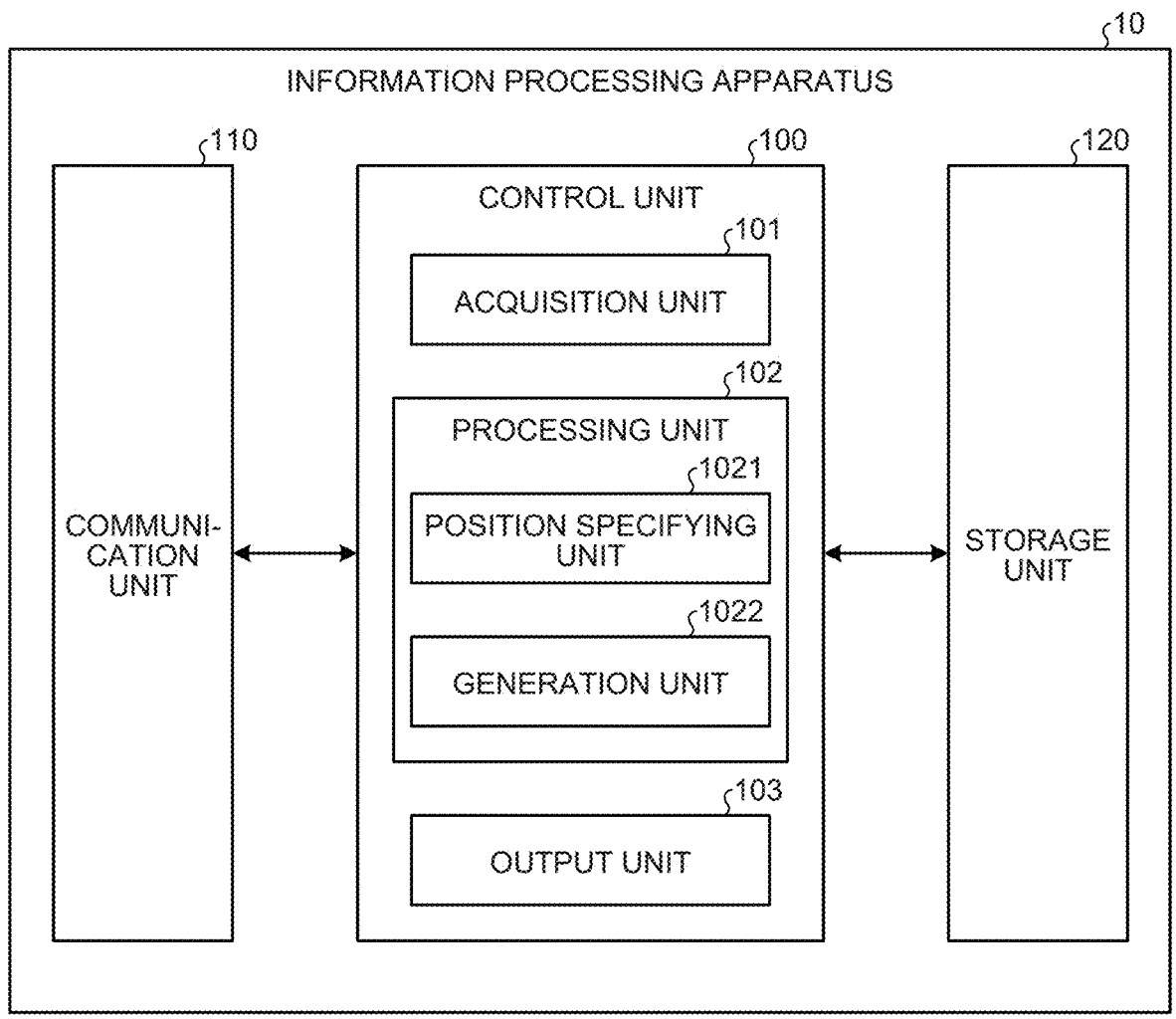
FIG. 8 is a block diagram illustrating a hardware configuration and a functional configuration of an information processing apparatus.

FIG. 8 is a block diagram illustrating a functional configuration of the information processing apparatus 10. As illustrated in FIG. 8, the information processing apparatus 10 includes a control unit 100, a communication unit 110, and a storage unit 120.

The communication unit 110 has a function of communicating with an external device. For example, in communication with an external device, the communication unit 110 supplies information received from the external device to the control unit 100. Specifically, the communication unit 110 supplies information received from the information providing device 30 and information received from the terminal device 20 to the control unit 100. Furthermore, the communication unit 110 transmits information supplied from the control unit 100 to the external device. Specifically, the communication unit 110 acquires, from the control unit 100, visualization information related to the target range generated by the control unit 100 based on the information supplied from the information providing device 30 and transmits the acquired visualization information to the terminal device 20. Furthermore, the communication unit 110 acquires, from the control unit 100, information indicating the target range generated by the control unit 100 based on the sensor information supplied from the terminal device 20 and transmits the acquired information to the information providing device 30.

The storage unit 120 is implemented by, for example, a semiconductor memory element such as a RAM or a flash memory, or a storage device such as a hard disk or an optical disk. The storage unit 120 has a function of storing information related to processing in the information processing apparatus 10. The storage unit 120 stores, for example, information related to the target range supplied from the information providing device 30.

The control unit 100 executes processing of controlling the operation of the information processing apparatus 10. For example, the control unit 100 executes processing for providing the visualization information to be displayed as AR in the target range in the terminal device 20 based on the information supplied from the information providing device 30. In order to execute this processing, the control unit 100 includes an acquisition unit 101, a processing unit 102, and an output unit 103 as illustrated in FIG. 8.

The acquisition unit 101 has a function of acquiring information for generating the visualization information. The acquisition unit 101 acquires, for example, sensor information transmitted from the terminal device 20 via the communication unit 110. For example, the acquisition unit 101 acquires, as the sensor information, sensor information for specifying the position and the target range of the terminal device 20, such as acceleration information, direction information, depth information, angular velocity information, map information, and position information described below. Furthermore, the acquisition unit 101 acquires the information related to the target range transmitted from the information providing device 30 via the communication unit 110. For example, the acquisition unit 101 acquires information on the sunlight amount and the soil moisture amount in the target range from the information providing device 30.

The processing unit 102 has a function of generating visualization information. As illustrated in FIG. 8, the processing unit 102 includes a position specifying unit 1021 and a generation unit 1022.

The position specifying unit 1021 has a function of specifying a target range. The position specifying unit 1021 specifies the position of the terminal device 20 and the direction in which the user faces based on the sensor information acquired from the terminal device 20. The position specifying unit 1021 specifies a target range that can be visually recognized by the user via the terminal device 20 in the field based on the specified position and direction.

The generation unit 1022 has a function of generating a three-dimensional graph of the sunlight amount and the soil moisture amount in the target range specified by the position specifying unit 1021, and an AR image indicating the complexity of vegetation. The generation unit 1022 requests the information providing device 30 via the communication unit 110 for information on the sunlight amount, the soil moisture amount, and the complexity of vegetation related to the target range specified by the position specifying unit 1021. The generation unit 1022 stores the information provided from the information providing device 30 in response to this request in the storage unit 120. The generation unit 1022 generates a three-dimensional graph of the sunlight amount and the soil moisture amount in the target range and an AR image indicating the complexity of vegetation based on the information on the sunlight amount, the soil moisture amount, and the complexity of vegetation related to the target range supplied from the information providing device 30.

The output unit 103 has a function of outputting information indicating a target range. The output unit 103 outputs information indicating the target range specified by the position specifying unit 1021 to the communication unit 110. The information indicating the target range output from the output unit 103 to the communication unit 110 is transmitted to the information providing device 30. Furthermore, the output unit 103 has a function of outputting visualization information. The output unit 103 outputs the visualization information generated by the generation unit 1022 to the communication unit 110. The visualization information output from the output unit 103 to the communication unit 110 is transmitted to the terminal device 20.

3.2. Configuration of Terminal Device

Figure 9:
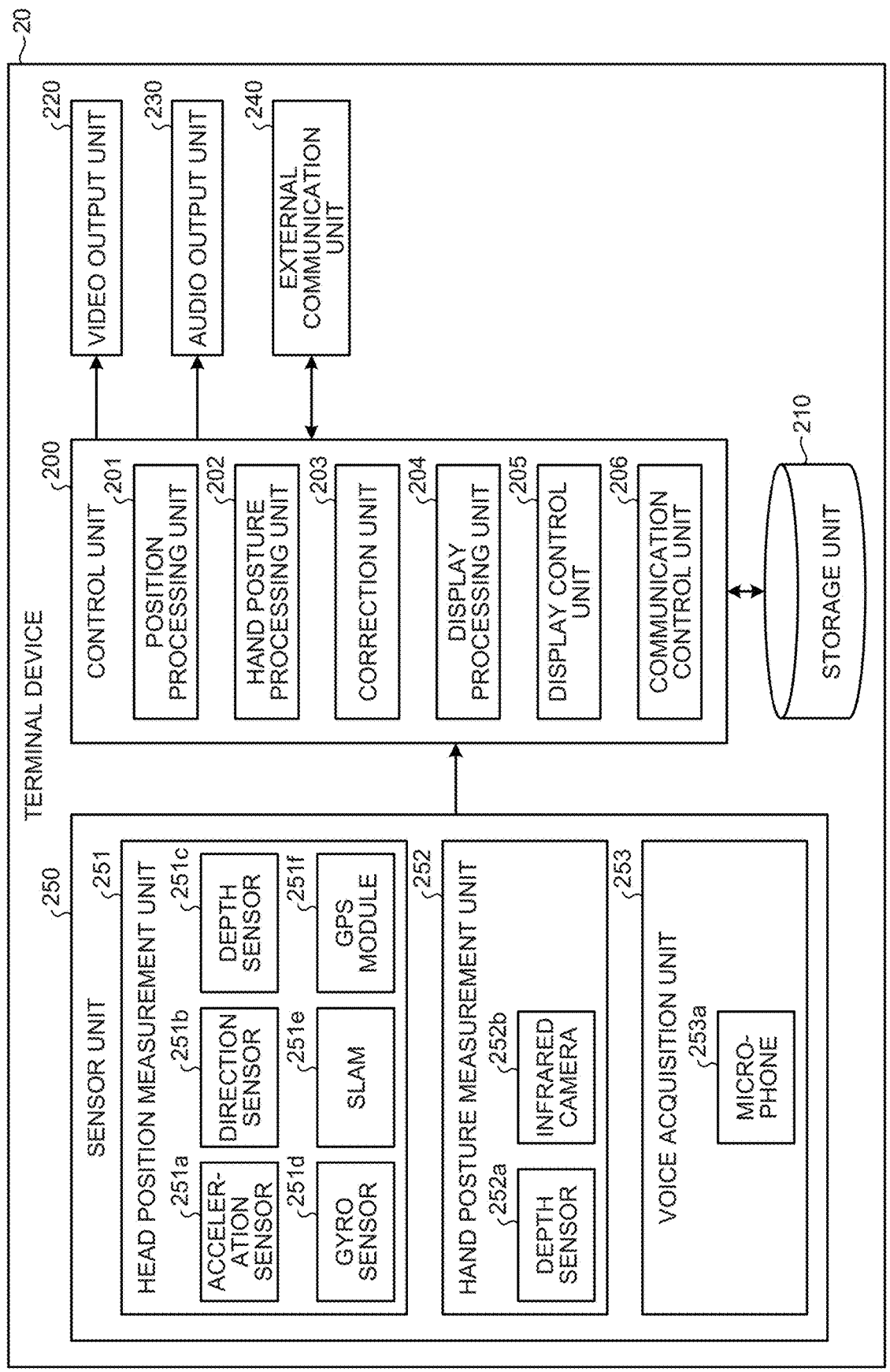
FIG. 9 is a block diagram illustrating a hardware configuration and a functional configuration of the terminal device.

FIG. 9 is a block diagram illustrating a hardware configuration and a functional configuration of the terminal device 20. The terminal device 20 includes a control unit 200, a storage unit 210, a video output unit 220, an audio output unit 230, an external communication unit 240, and a sensor unit 250.

The sensor unit 250 includes a head position measurement unit 251, a hand posture measurement unit 252, and a voice acquisition unit 253.

The head position measurement unit 251 includes an acceleration sensor 251a, a direction sensor 251b, a depth sensor 251c, a gyro sensor 251d, an SLAM 251e, and a GPS module 251f. The acceleration sensor 251a is, for example, a three-axis acceleration sensor. The acceleration sensor 251a outputs acceleration information indicating the measured acceleration. The direction sensor 251b is a sensor that measures geomagnetism and detects a direction the terminal device 20 faces. The direction sensor 251b outputs direction information indicating the detected direction. The depth sensor 251c is a sensor that measures a distance from the terminal device 20 to a person or an object present in a target range. The depth sensor 251c outputs depth information indicating the measured distance. The gyro sensor 251d is a sensor that measures the angular velocity of the terminal device 20. The gyro sensor 251d outputs angular velocity information indicating the measured angular velocity. The SLAM 251e is, for example, a light detection and ranging (Lidar) simultaneous localization and mapping (SLAM) including a laser scanner or a visual SLAM including a camera. The SLAM 251e senses a target range and outputs map information indicating an environmental map of the target range. The GPS module 251f receives a radio wave measured from a satellite by a satellite positioning system and measures the position of the terminal device 20. The GPS module 251f outputs position information indicating the measured position.

The hand posture measurement unit 252 includes a depth sensor 252a and an infrared camera 252b. The infrared camera 252b outputs infrared light, receives the infrared light reflected by the hand of the user, and photographs the hand of the user. The depth sensor 252a measures the distance to the hand of the user based on the image of the hand of the user generated by the infrared camera 252b. The hand posture measurement unit 252 outputs hand posture information including the measured distance to the hand of the user and the image of the hand of the user.

The voice acquisition unit 253 includes a microphone 253a. The microphone 253a collects a sound around the terminal device 20 and outputs voice information indicating the collected sound.

The storage unit 210 is implemented by, for example, a semiconductor memory element such as a RAM or a flash memory. The storage unit 210 has a function of storing information related to processing in the terminal device 20. The storage unit 120 stores, for example, the visualization information supplied from the information processing apparatus 10. In addition, the storage unit 120 stores an application program executed by the terminal device 20. The application program stored in the storage unit 120 is, for example, a program that causes the user to visually recognize the graphs of the solar radiation amount and the soil moisture amount of the field, the complexity of vegetation, and the like by AR display.

The control unit 200 is implemented by executing the application program stored in the storage unit 210. As illustrated in FIG. 9, the control unit 200 includes a position processing unit 201, a hand posture processing unit 202, a correction unit 203, a display processing unit 204, a display control unit 205, and a communication control unit 206.

Based on the sensor information output from the sensor unit 250, the position processing unit 201 specifies the above-described head position P, the waist position P2 which is an example of a predetermined part of the body, the inclination angle θ of the terminal device 20, and the like. The hand posture processing unit 202 specifies the position and posture of the hand of the user based on the hand posture information output from the hand posture measurement unit 252. The correction unit 203 corrects the waist position P2 based on the head position P and the angle θ. The display processing unit 204 generates images of the operation buttons B11 to B13 and the like to be displayed by AR and generates images of the virtual hand HL and the virtual hand HR based on the position and the posture specified by the hand posture processing unit 202. Furthermore, the display processing unit 204 generates an image to be displayed as AR such as a graph GR based on the visualization information provided from the information processing apparatus 10. The display control unit 205 controls the video output unit 220 such that the images of the operation buttons B11 to B13 and the like generated by the display processing unit 204 are displayed as AR at the waist position P2 corrected by the correction unit 203. Furthermore, the display control unit 205 controls the video output unit 220 such that the images of the virtual hand HL and the virtual hand HR are displayed as AR at the position of the hand specified by the hand posture processing unit 202. Furthermore, the display control unit 205 controls the video output unit 220 so that the image generated based on the visualization information in the display processing unit 204 is displayed as AR in the symmetric range. The communication control unit 206 controls the external communication unit 240 to transmit information to the information processing apparatus 10 and receive information from the information processing apparatus 10.

The video output unit 220 displays the AR image output from the control unit 200 and visually recognized by the user on a half mirror. The audio output unit 230 includes a speaker and outputs a sound represented by an audio signal supplied from an external device. The external communication unit 240 has a function of communicating with an external device. For example, in communication with an external device, the external communication unit 240 supplies information received from the external device to the control unit 200. Specifically, the external communication unit 240 supplies the visualization information received from the information processing apparatus 10 to the control unit 200. Furthermore, the external communication unit 240 transmits information supplied from the control unit 200 to the external device in communication with the external device. Specifically, the external communication unit 240 transmits the sensor information output from the sensor unit 250 to the control unit 200 to the information processing apparatus 10.

3.3. Configuration of Information Providing Device

Figure 10:
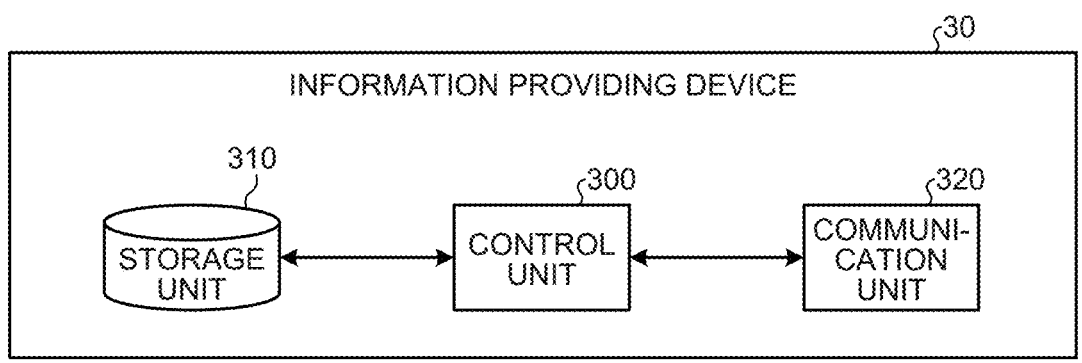
FIG. 10 is a block diagram illustrating hardware of an information providing device.

FIG. 10 is a block diagram illustrating hardware configuration of the information providing device 30. As illustrated in FIG. 10, the information providing device 30 includes a control unit 300, a storage unit 310, and a communication unit 320.

The communication unit 320 has a function of communicating with an external device. For example, in communication with an external device, the communication unit 320 outputs information received from the external device to the control unit 300. Specifically, the communication unit 320 outputs information received from the information processing apparatus 10 to the control unit 300. For example, the communication unit 320 outputs information indicating the target range transmitted from the information processing apparatus 10 to the control unit 300. Furthermore, the communication unit 320 transmits the information related to the target range supplied from the control unit 300 to the information processing apparatus 10.

The control unit 300 has a function of controlling the operation of the information providing device 30. For example, the control unit 300 transmits various types of information related to the target range to the information processing apparatus 10 via the communication unit 320. For example, the control unit 300 transmits the sunlight amount, the soil moisture amount, and the complexity of vegetation in the target range acquired by accessing the storage unit 310 to the information processing apparatus 10.

The storage unit 310 is implemented by, for example, a semiconductor memory element such as a RAM or a flash memory, or a storage device such as a hard disk or an optical disk. The storage unit 310 has a function of storing data related to processing in the information providing device 30. The storage unit 310 stores, for example, information on the sunlight amount and the soil moisture amount acquired from the sensor group 40 installed in the field, a video of the field, and the like.

3.4. Processing of Information Processing System

Figure 11:
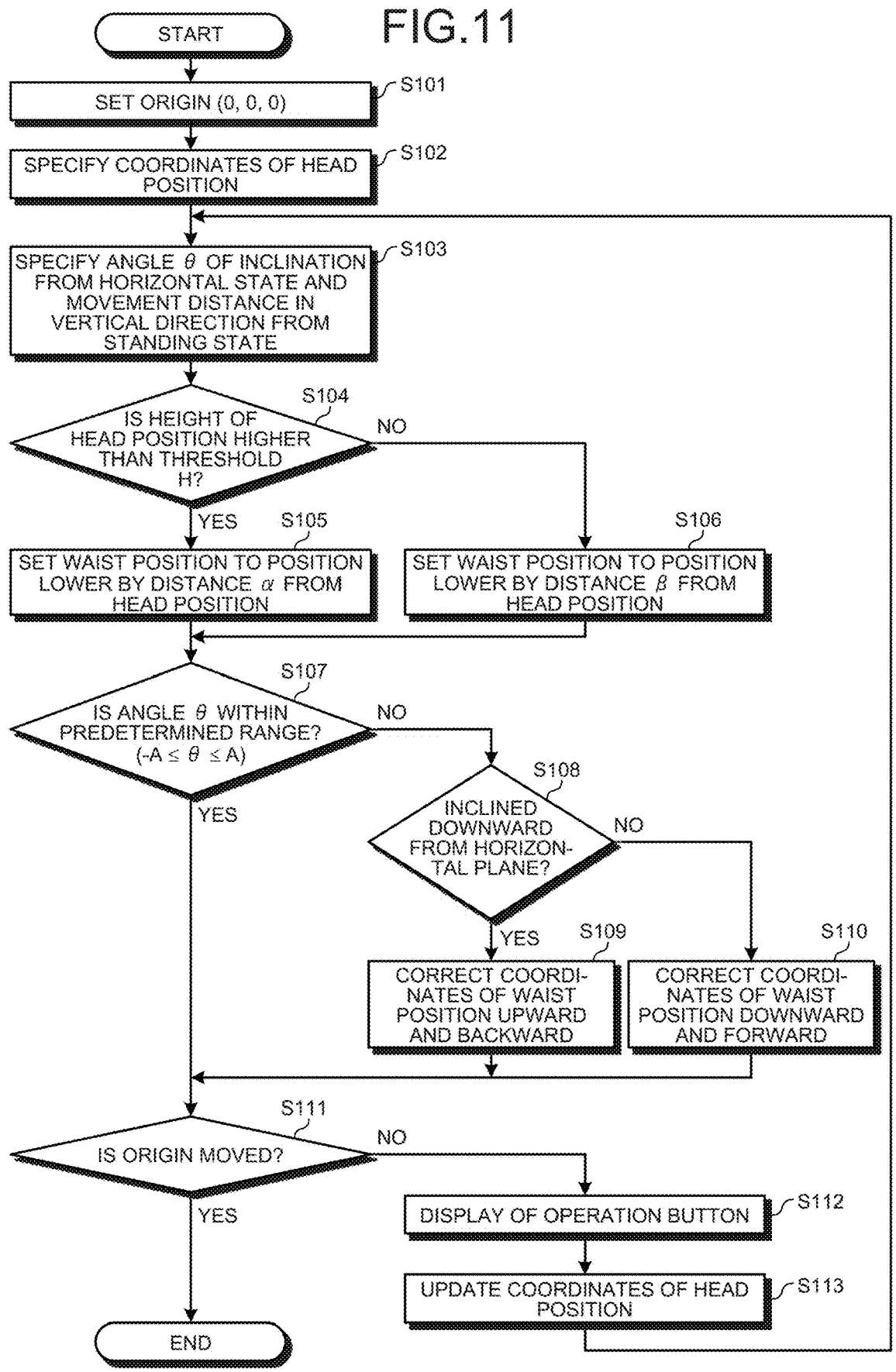
FIG. 11 is a flowchart illustrating a flow of processing executed when the operation button is displayed.

Next, processing performed in the information processing system 1 is described. FIG. 11 is a flowchart illustrating a flow of processing executed when the operation buttons B11 to B13 are displayed on the terminal device 20. First, the terminal device 20 sets a predetermined position in the field as an origin (0, 0, 0) (step S101). Next, the terminal device 20 specifies the coordinates of the head position P1 when the user is in the standing state based on the information output from the sensor unit 250 (step S102). Furthermore, the terminal device 20 specifies the angle θ of the inclination of the terminal device 20 from the horizontal state and the movement distance Δh of the terminal device 20 in the vertical direction from the standing state based on the information output from the sensor unit 250 (step S103).

The terminal device 20 determines whether the height of the head position P1 is higher than the above-described threshold H based on the coordinates specified in step S102 (step S104). When the height of the head position P1 is higher than the threshold H (Yes in step S104), the terminal device 20 sets the waist position P2 of the user to a position lower by the distance α from the head position P1 to the waist (step S105). Meanwhile, in a case where the height of the head position P1 is equal to or less than the threshold H (No in step S104), the terminal device 20 sets the waist position P2 of the user to a position lower by the distance β from the head position P1 (step S106).

Next, the terminal device 20 determines whether the angle θ of the inclination from the horizontal state specified in step S103 is within a predetermined range (−A≤θ≤A) (step S107). When the angle θ of inclination from the horizontal state is within the predetermined range (Yes in step S107), the terminal device 20 moves a flow of the processing to step S111.

When the inclination angle θ from the horizontal state is not within the predetermined range (No in step S107), the terminal device 20 determines whether the terminal device 20 is inclined downward from the horizontal plane (step S108). When inclined downward from the horizontal plane (Yes in step S108), the terminal device 20 corrects the coordinates of the waist position P2 upward and backward (step S109). Here, as described above, the terminal device 20 calculates the coordinates of the waist position P2 after correction by Expressions (1) to (3) described above. Also, when inclined upward from the horizontal plane (No in step S108), the terminal device 20 corrects the coordinates of the waist position P2 downward and forward (step S110). Here, as described above, the terminal device 20 calculates the coordinates of the waist position P2 after correction by Expressions (4) to (6) described above. After the processing of step S109 or S110, the terminal device 20 moves the flow of the processing to step S111.

In step S111, the terminal device 20 determines whether the origin is moved (step S111). In a case where the origin is moved (Yes in step S111), the terminal device 20 ends the processing illustrated in FIG. 11. When the origin is not moved (No in step S111), the terminal device 20 displays the operation buttons B11 to B13 at the waist position P2 (step S113). Here, in a case where it is determined as Yes in step S107, the terminal device 20 displays the operation buttons B11 to B13 based on the waist position P2 set in step S105 or S106. Furthermore, in a case where it is determined as No in step S107, the terminal device 20 displays the operation buttons B11 to B13 based on the waist position P2 corrected in step S109 or S110. Next, the terminal device 20 updates the coordinates of the head position P1 based on the information output from the sensor unit 250 (step S113) and returns the flow of processing to step S103.

Figure 12:
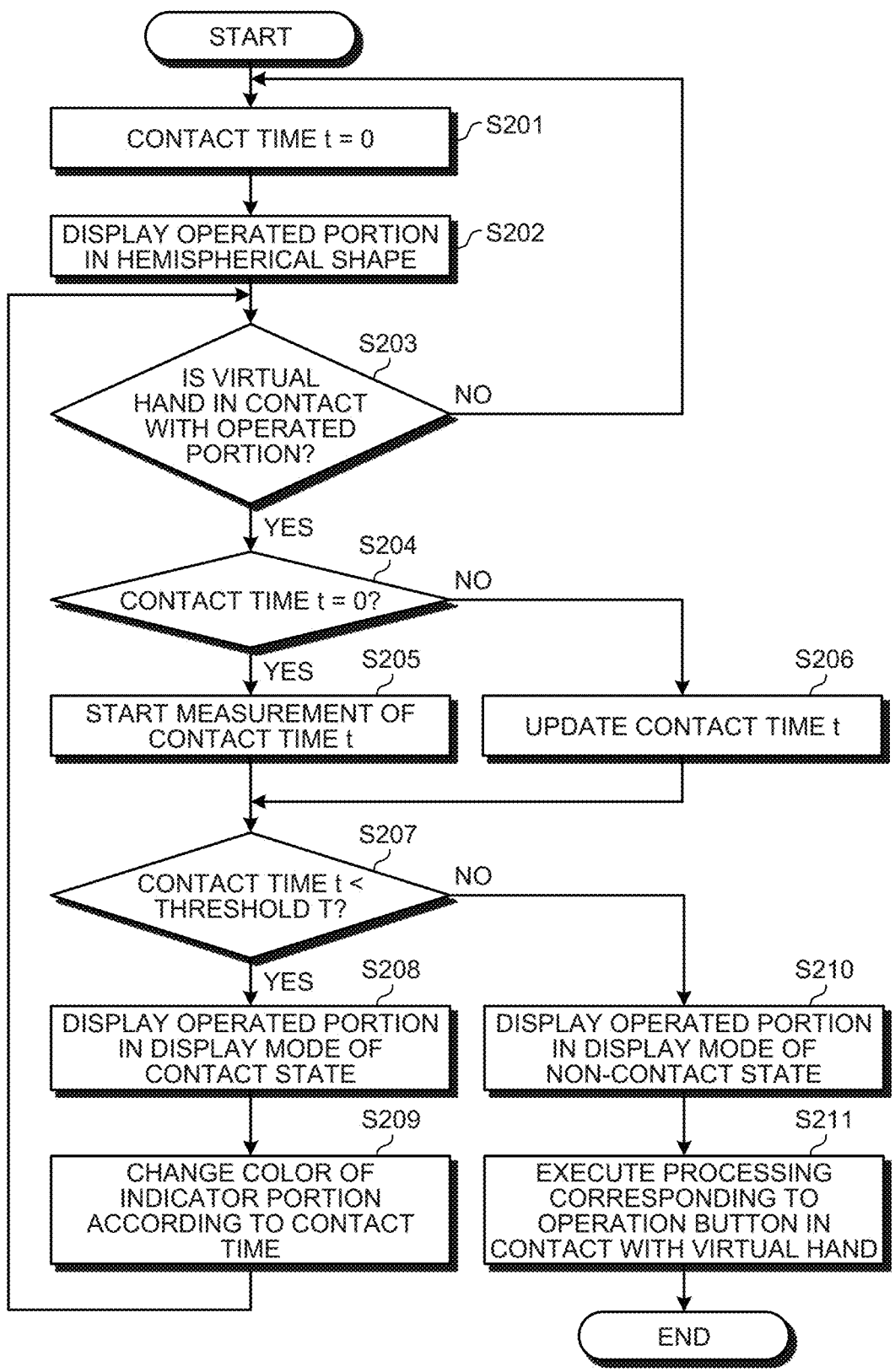
FIG. 12 is a flowchart illustrating a flow of processing of changing a display mode of the operation button.

FIG. 12 is a flowchart illustrating a flow of processing of changing a display mode of the operation buttons B11 to B13. First, the terminal device 20 initializes contact time t between the virtual hand and the operation button before displaying the operation buttons B11 to B13 (step S201). Next, the terminal device 20 displays the operated portion C1 in a hemispherical shape based on the waist position P2 specified in the processing of FIG. 11 for the operation buttons B11 to B13 (step S202).

After displaying the operation buttons B11 to B13, the terminal device 20 determines whether the virtual hand HL or the virtual hand HR is in contact with the operated portion C1 (step S203). Specifically, the terminal device 20 determines whether the virtual hand HL or the virtual hand HR is in contact with the operated portion C1 based on the display positions of the operation buttons B11 to B13 and the positions of the virtual hand HL and the virtual hand HR. When the virtual hand HL or the virtual hand HR is not in contact with the operated portion C1 (No in step S203), the terminal device 20 returns the flow of the processing to step S201. When the virtual hand HL or the virtual hand HR is in contact with the operated portion C1 (Yes in step S203), the terminal device 20 determines whether the contact time t=0 (step S204). When the contact time t=0 (Yes in step S204), the terminal device 20 starts to measure the contact time t (step S205). When the contact time t is not 0 (No in step S204), the terminal device 20 updates the contact time t (step S206).

After step S205 or S206, the terminal device 20 determines whether the contact time t being measured is less than the threshold T (step S207). When the contact time t is less than the threshold T (Yes in step S207), the terminal device 20 displays the height of the operated portion C1 in contact with the virtual hand HL or the virtual hand HR in the display mode of the contact state in which the height is lowered from the hemispherical shape as illustrated in FIG. 5(b) (step S208). Next, as illustrated in FIGS. 5(b) to 5(d), the terminal device 20 changes the color of the indicator portion C2 according to the contact time t (step S209). Then, the terminal device 20 returns the flow of the processing to step S203.

Meanwhile, in a case where the contact time t is equal to or longer than the threshold (No in step S207), the terminal device 20 displays the operated portion C1 in a display mode of a non-contact state with the hemispherical shape as illustrated in FIG. 5(a) (step S210). Next, the terminal device 20 executes processing corresponding to the operation button in contact with the virtual hand HL or the virtual hand HR (step S211) and ends the processing.

For example, in a case where the contact time t of the virtual hand HL or the virtual hand HR with the operation button B11 is equal to or longer than the threshold T, the terminal device 20 transmits the sensor information to the information processing apparatus 10. The information processing apparatus 10 specifies the recognition range of the user based on the sensor information transmitted from the terminal device 20. The information processing apparatus 10 transmits information indicating the specified recognition range to the information providing device 30. The information providing device 30 transmits information on the sunlight amount in the recognition range indicated by the information transmitted from the information processing apparatus 10 to the information processing apparatus 10. The information processing apparatus 10 generates an AR image representing the three-dimensional graph of the sunlight amount in the target range based on the information transmitted from the information providing device 30 and transmits information of the generated AR image to the terminal device 20 as visualization information. The terminal device 20 receives the visualization information transmitted from the information processing apparatus 10 and displays the graph GR of the AR image represented by the received visualization information, for example, as illustrated in FIG. 6.

3.5. Variations of Processing

Next, variations of the processing of the present embodiment is described. Note that variations of the processing described below may be applied to the present embodiment alone or may be applied to the present embodiment in combination. Further, variations of the processing may be applied instead of the configuration described in the present embodiment or may be additionally applied to the configuration described in the present embodiment.

Figure 13:
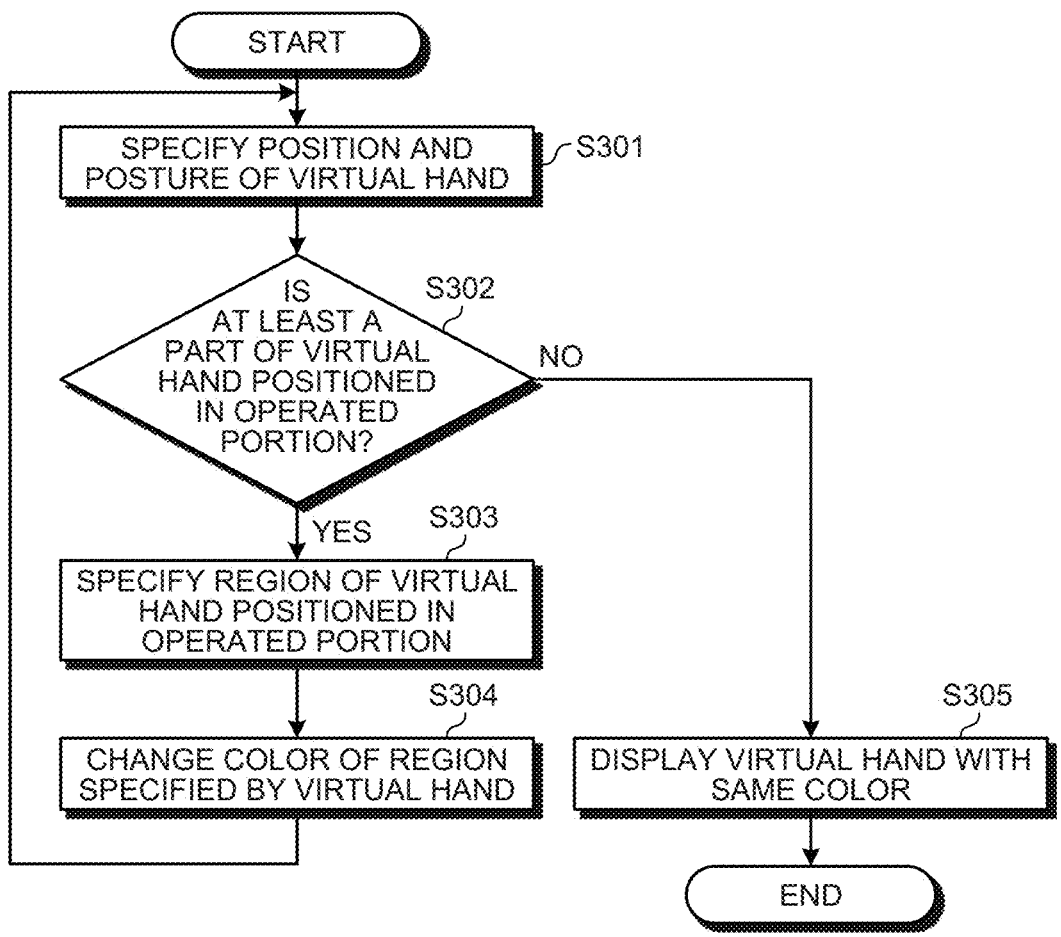
FIG. 13 is a flowchart illustrating a flow of processing of changing a display mode of the operation button.

FIG. 13 is a flowchart illustrating a flow of processing of changing the display modes of the operation buttons B11 to B13 as illustrated in FIG. 7 according to the overlap between the virtual hand HR or the virtual hand HL and the operated portion C1. First, the terminal device 20 specifies the position and posture of the virtual hand HR or the virtual hand HL based on the hand posture information output from the hand posture measurement unit 252 (step S301).

Next, the terminal device 20 determines whether at least a part of the virtual hand HR or the virtual hand HL is positioned in the operated portion C1 based on the specified position and posture of the virtual hand HR or the virtual hand HL and the display positions of the operation buttons B11 to B13 (step S302). In a case where at least a part of the virtual hand HR or the virtual hand HL is not positioned in the operated portion C1 (No in step S302), for example, the terminal device 20 displays the virtual hand HR and the virtual hand HL in the same color as illustrated in FIG. 2 (step S305) and ends the processing.

Meanwhile, when a part of the virtual hand HR or the virtual hand HL is positioned in the operated portion C1 (Yes in step S302), the terminal device 20 specifies a region of the virtual hand HR or the virtual hand HL positioned in the operated portion C1 (step S303). Then, the terminal device 20 changes the color of the region specified in step S303, for example, as illustrated in FIG. 7 (step S304) and returns the flow of the processing to step S301.

In the present invention, the display positions of the operation buttons B11 to B13 may be corrected according to the length of the arm of the user. In the present invention, the display positions of the operation buttons B11 to B13 may be corrected according to the state of motion the user. In the present invention, the posture state of the user may be estimated from the trajectory of the posture of the user specified by the acceleration sensor 251a and the gyro sensor 251d, and the waist position P2 may be corrected according to the estimated posture state. In the present invention, when an object is detected by the sensor unit 250, and the position of the detected object overlaps with the display position of the operation buttons B11 to B13, the display positions of the operation buttons B11 to B13 may be corrected so as not to overlap with the detected object. In the present invention, when the voice acquired by the voice acquisition unit 253 is recognized, and the recognized voice is a voice instructing the display of the operation buttons B11 to B13, the operation buttons B11 to B13 may be displayed at the position of the virtual hand HL or the virtual hand HR. In the present invention, whether the displayed operation button can be operated may be represented by the color or transparency of the operated portion C1. In the present invention, in a case where the direction of the line of sight of the user is detected, and the direction of the line of sight of the user is the direction of the operation buttons B11 to B13 for a certain period of time or more, processing of a function corresponding to the operation button in the direction of the line of sight of the user may be executed. In the present invention, the user may be notified of the lapse of the contact time by vibration or sound. In the present invention, the threshold H or the threshold T may be a value determined for each user. In the present invention, the contact between the virtual hand HL and the virtual hand HR may be determined in a range wider than the displayed operated portion C1. In the present invention, the terminal device 20 displays the operation buttons B11 to B13 around the waist of the user, but the position where the operation buttons B11 to B13 are displayed is not limited to the position of the waist, and may be, for example, around the chest of the user. Although the above-described embodiment is a configuration for performing the AR display corresponding to the Synecoculture, the AR display displayed by the information processing system 1 is not limited to the AR display corresponding to the Synecoculture, and for example, the AR display corresponding to work in a factory or work at a building site may be performed.

4. Hardware Configuration Example

Figure 14:
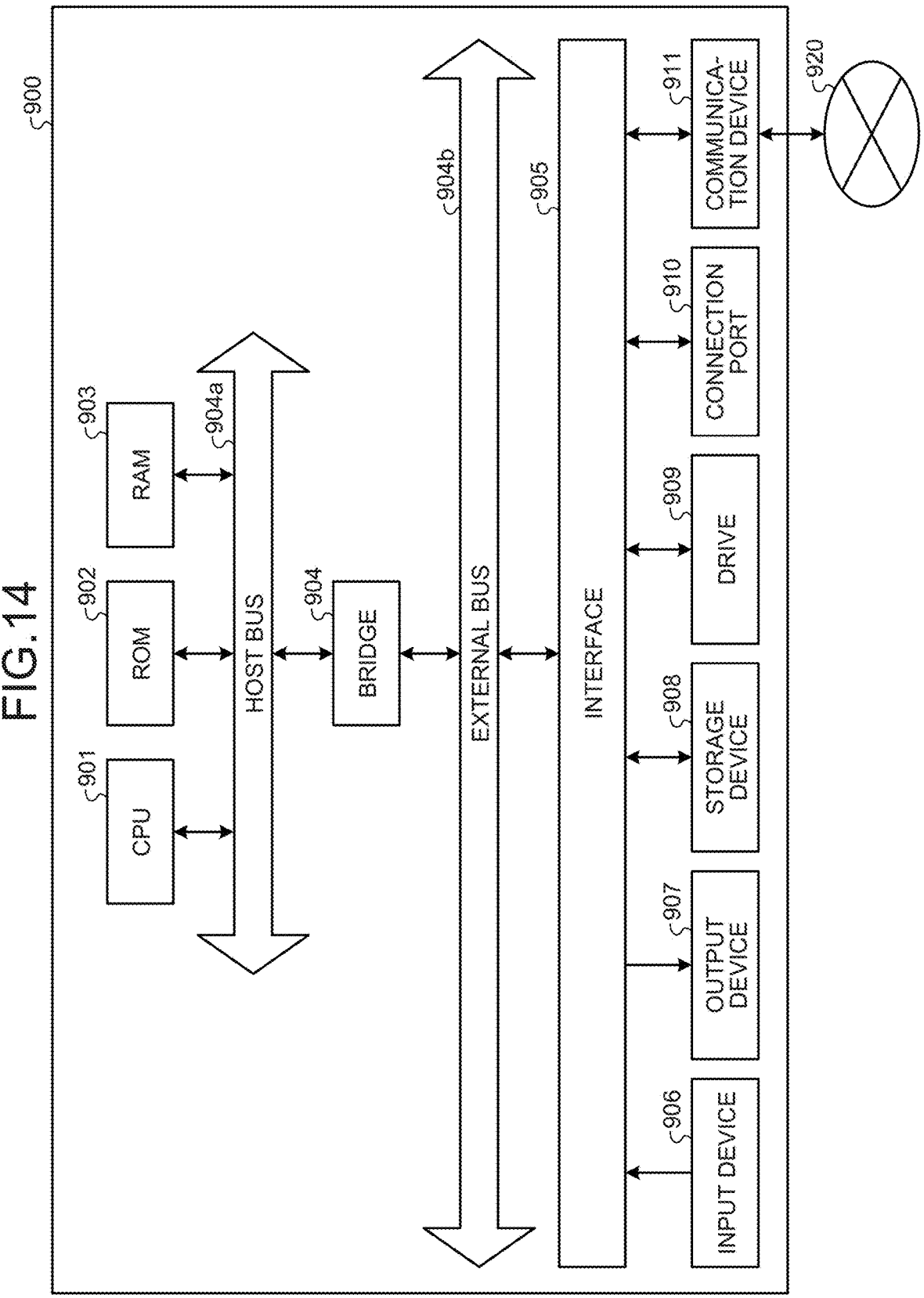
FIG. 14 is a hardware configuration diagram illustrating an example of a computer that realizes functions of the information processing apparatus.

Next, a hardware configuration example of the information processing apparatus according to the embodiment is described with reference to FIG. 14. FIG. 14 is a block diagram illustrating a hardware configuration example of an example of a computer that realizes the functions of the information processing apparatus according to the embodiment. Note that an information processing apparatus 900 illustrated in FIG. 14 can implement, for example, the information processing apparatus 10, the terminal device 20, and the information providing device 30 illustrated in FIG. 1. Information processing by the information processing apparatus 10, the terminal device 20, and the information providing device 30 according to the embodiment is realized by software and hardware described below in cooperation.

As illustrated in FIG. 14, the information processing apparatus 900 includes a central processing unit (CPU) 901, a read only memory (ROM) 902, and a random access memory (RAM) 903. Furthermore, the information processing apparatus 900 includes a host bus 904a, a bridge 904, an external bus 904b, an interface 905, an input device 906, an output device 907, a storage device 908, a drive 909, a connection port 910, and a communication device 911. Note that the hardware configuration illustrated here is an example, and some of the components may be omitted. In addition, the hardware configuration may further include components other than the components shown here.

The CPU 901 functions as, for example, an arithmetic processing device or a control device and controls the overall operation of each component or a part thereof based on various programs recorded in the ROM 902, the RAM 903, or the storage device 908. The ROM 902 is a unit that stores a program read by the CPU 901, data used for calculation, and the like. The RAM 903 temporarily or permanently stores, for example, a program read by the CPU 901, various parameters that appropriately change when the program is executed, and the like. These are connected to each other by the host bus 904a including a CPU bus or the like. The CPU 901, the ROM 902, and the RAM 903 can realize the functions of the control unit 100, the control unit 200, and the control unit 300 described with reference to FIGS. 8 to 10, for example, in cooperation with software.

The CPU 901, the ROM 902, and the RAM 903 are connected to each other via, for example, the host bus 904a capable of high-speed data transmission. Meanwhile, the host bus 904a is connected, for example, to the external bus 904b having a relatively low data transmission speed via the bridge 904. The external bus 904b is connected to various components via the interface 905.

The input device 906 is implemented by, for example, a device to which information is input, such as a mouse, a keyboard, a touch panel, a button, a microphone, a switch, and a lever. In addition, the input device 906 may be, for example, a remote control device using infrared rays or other radio waves or may be external connection equipment such as a mobile phone or a PDA supporting the operation of the information processing apparatus 900. Furthermore, the input device 906 may include, for example, an input control circuit that generates an input signal based on information input using the above input means and outputs the input signal to the CPU 901. By operating the input device 906, the user of the information processing apparatus 900 can input various data to the information processing apparatus 900 and instruct the information processing apparatus 900 on processing operations.

In addition, the input device 906 can be formed by a device that detects the position of the user. For example, the input device 906 may include various sensors such as an image sensor (for example, a camera), a depth sensor (for example, a stereo camera), an acceleration sensor, a gyro sensor, a geomagnetic sensor, an optical sensor, a sound sensor, a distance measurement sensor (for example, a time of flight (ToF) sensor), and a force sensor. Furthermore, the input device 906 may acquire information related to the state of the information processing apparatus 900 itself such as the posture and moving speed of the information processing apparatus 900, and information related to the surrounding space of the information processing apparatus 900 such as brightness and noise around the information processing apparatus 900. Furthermore, the input device 906 may include a global navigation satellite system (GNSS) module that receives a GNSS signal (for example, a global positioning system (GPS) signal from a GPS satellite) from a GNSS satellite and measures position information including the latitude, longitude, and altitude of the device. Furthermore, related to the position information, the input device 906 may detect the position by transmission and reception with Wi-Fi (registered trademark), a mobile phone, a PHS, a smartphone, or the like, near field communication, or the like. The input device 906 can realize, for example, the function of the sensor unit 250 described with reference to FIG. 9.

The output device 907 is formed with a device capable of visually or aurally notifying the user of the acquired information. Examples of such a device include a display device such as a CRT display device, a liquid crystal display device, a plasma display device, an EL display device, a laser projector, an LED projector, and a lamp, a sound output device such as a speaker and a headphone, and a printer device. The output device 907 outputs, for example, results obtained by various types of processing executed by the information processing apparatus 900. Specifically, the display device visually displays the results obtained by various processing executed by the information processing apparatus 900 in various formats such as text, images, tables, and graphs. Meanwhile, the audio output device converts an audio signal including reproduced audio data, acoustic data, or the like into an analog signal and aurally outputs the analog signal. The output device 907 can realize, for example, the functions of the video output unit 220 and the audio output unit 230 described with reference to FIG. 9.

The storage device 908 is a data storage device formed as an example of the storage unit of the information processing apparatus 900. The storage device 908 is implemented by, for example, a magnetic storage device such as an HDD, a semiconductor storage device, an optical storage device, or a magneto-optical storage device. The storage device 908 may include a storage medium, a recording device that records data in the storage medium, a reading device that reads data from the storage medium, a deletion device that deletes data recorded in the storage medium, and the like. The storage device 908 stores programs or various items of data executed by the CPU 901, various items of data acquired from the outside, and the like. The storage device 908 can realize, for example, the functions of the storage unit 120, the storage unit 210, and the storage unit 310 described with reference to FIGS. 8 to 10.

The drive 909 is a reader/writer for a storage medium and is built in or externally attached to the information processing apparatus 900. The drive 909 reads information recorded in a removable storage medium such as a mounted magnetic disk, optical disk, magneto-optical disk, or semiconductor memory and outputs the information to the RAM 903. Furthermore, the drive 909 can also write information to the removable storage medium.

The connection port 910 is, for example, a port for connecting an external connection device such as a universal serial bus (USB) port, an IEEE 1394 port, a small computer system interface (SCSI), an RS-232C port, or an optical audio terminal.

The communication device 911 is, for example, a communication interface formed with a communication device or the like for connection to the communication network 920. The communication device 911 is, for example, a communication card for wired or wireless local area network (LAN), long term evolution (LTE), Bluetooth (registered trademark), wireless USB (WUSB), or the like. Furthermore, the communication device 911 may be a router for optical communication, a router for asymmetric digital subscriber line (ADSL), a modem for various types of communication, or the like. For example, the communication device 911 can transmit and receive signals and the like to and from the Internet and other communication devices according to a predetermined protocol such as TCP/IP. The communication device 911 can realize, for example, the functions of the communication unit 110, the external communication unit 240, and the communication unit 320 described with reference to FIGS. 8 to 10.

Note that the communication network 920 is a wired or wireless transmission path of information transmitted from a device connected to the communication network 920. For example, the communication network 920 may include a public network such as the Internet, a telephone network, or a satellite communication network, various local area networks (LANs) including Ethernet (registered trademark), a wide area network (WAN), or the like. Furthermore, the communication network 920 may include a dedicated line network such as an Internet protocol-virtual private network (IP-VPN).

An example of the hardware configuration capable of realizing the functions of the information processing apparatus 900 according to the embodiment is described above.

Each of the above-described components may be realized using a general-purpose member or may be realized by hardware specialized for the function of each component. Therefore, it is possible to appropriately change the hardware configuration to be used according to the technical level at the time of carrying out the embodiment.

5. Conclusion

As described above, the terminal device 20 according to the embodiment executes processing of correcting the display position of the GUI displayed as AR based on the position of the terminal device 20 in the vertical direction and the inclination of the terminal device 20. As a result, since the operation buttons B11 to B13 are always displayed around the position of the waist of the user, the operation buttons B11 to B13 can be immediately found even if the user changes the position and posture, and improvement of usability can be promoted. Furthermore, in the present embodiment, since the waist position is calculated on the basis of the body position of the user, the operation of the operation buttons B11 to B13 can be always performed at the same waist position. Furthermore, in the present embodiment, since the operation buttons B11 to B13 are always displayed on the basis of the waist of the user, the user can learn the positional relationship between the operation buttons B11 to B13 and the user's own body when the user is get used to the operation. Therefore, even if the operation buttons B11 to B13 are not placed at the center of the field of view, the operation buttons B11 to B13 can be operated by the motion feeling of the body and can be operated with one hand while working.

Furthermore, in the present embodiment, since the display mode of the operated portion C1 or the indicator portion C2 changes according to the operation, the user can notice the change in the display mode and can operate the operation buttons B11 to B13 even while performing other work. Furthermore, according to the display mode illustrated in FIG. 7, since it is possible to cause the user to recognize that the hand of the user is in contact with the operated portion C1, the user can easily recognize that the hand of the user is in contact with the operated portion C1.

Note that the present technology can also have the following configurations.

(1)

An information processing apparatus comprising:
 a position processing unit that estimates a head position of a user and estimates a position of a predetermined part of a body of the user based on the estimated head position;
 a correction unit that corrects the position of the predetermined part estimated by the position processing unit based on the head position and an angle of inclination of a head of the user; and
 a display control unit that executes processing of displaying an image operated by the user to be overlapped with a space visually recognized by the user based on the position corrected by the correction unit.

(2)

The information processing apparatus according to (1),
 wherein the correction unit corrects the position of the predetermined part in a vertical direction based on a reference height.

(3)

The information processing apparatus according to (1) or (2),
wherein the correction unit corrects the position of the predetermined part in a front-back direction of the user in a case where the angle of the inclination of the head from a horizontal state is out of a predetermined range.

(4)

The information processing apparatus according to (3), wherein the correction unit corrects the position of the predetermined part in a backward direction of the user in a case where the head is inclined downward from the horizontal state.

(5)

The information processing apparatus according to (3) or (4),
wherein the correction unit corrects the position of the predetermined part in a forward direction of the user in a case where the head is inclined upward from the horizontal state.

(6)

The information processing apparatus according to (1), further comprising:
a display processing unit that changes a display mode of the image when the image is operated by the user.

(7)

The information processing apparatus according to (6), wherein the display processing unit changes the display mode of the image according to an elapsed time from a start of an operation on the image by the user.

(8)

The information processing apparatus according to (6) or (7),
wherein the position processing unit estimates a position of a hand of the user,
the display control unit displays the image of the hand of the user to be overlapped with a space visually recognized by the user based on the position estimated by the position processing unit, and
the display processing unit changes the display mode of the image of the hand according to overlapping with the image operated by the user.

(9)

An information processing method comprising:
a position processing step of estimating a head position of a user and estimating a position of a predetermined part of a body of the user based on the estimated head position;
a correction step of correcting the position of the predetermined part estimated in the position processing step based on the head position and an angle of inclination of a head of the user; and
a display control step of executing processing of displaying an image operated by the user to be overlapped with a space visually recognized by the user based on the position corrected in the correction step.

(10)

A program causing a computer to execute:
a position processing step of estimating a head position of a user and estimating a position of a predetermined part of a body of the user based on the estimated head position;
a correction step of correcting the position of the predetermined part estimated in the position processing step based on the head position and an angle of inclination of a head of the user; and
a display control step of executing processing of displaying an image operated by the user to be overlapped with a space visually recognized by the user based on the position corrected in the correction step.

REFERENCE SIGNS LIST

1 INFORMATION PROCESSING SYSTEM
10 INFORMATION PROCESSING APPARATUS
20 TERMINAL DEVICE
30 INFORMATION PROVIDING DEVICE
40 SENSOR GROUP
100 CONTROL UNIT
101 ACQUISITION UNIT
102 PROCESSING UNIT
1021 POSITION SPECIFYING UNIT
1022 GENERATION UNIT
103 OUTPUT UNIT
110 COMMUNICATION UNIT
120 STORAGE UNIT
200 CONTROL UNIT
201 POSITION PROCESSING UNIT
202 HAND POSTURE PROCESSING UNIT
203 CORRECTION UNIT
204 DISPLAY PROCESSING UNIT
205 DISPLAY CONTROL UNIT
206 COMMUNICATION CONTROL UNIT
210 STORAGE UNIT
220 VIDEO OUTPUT UNIT
230 SOUND OUTPUT UNIT
240 EXTERNAL COMMUNICATION UNIT
250 SENSOR UNIT
251 HEAD POSITION MEASUREMENT UNIT
251$a$ ACCELERATION SENSOR
251$b$ DIRECTION SENSOR
251$c$ DEPTH SENSOR
251$d$ GYRO SENSOR
251$e$ SLAM
251$f$ GPS MODULE
252 HAND POSTURE MEASUREMENT UNIT
252$a$ DEPTH SENSOR
252$b$ INFRARED CAMERA
253 VOICE ACQUISITION UNIT
253$a$ MICROPHONE
300 CONTROL UNIT
310 STORAGE UNIT
320 COMMUNICATION UNIT
B11 to B13 OPERATION BUTTON
C1 OPERATED PORTION
C2 INDICATOR PORTION
C3 FUNCTION DISPLAY PORTION

The invention claimed is:

1. An information processing apparatus comprising:
a position processing unit that estimates a head position of a user and estimates a position of a predetermined part of a body of the user based on the estimated head position;
a correction unit that corrects the position of the predetermined part estimated by the position processing unit based on the head position and an angle of inclination of a head of the user; and
a display control unit that executes processing of displaying an image operated by the user to be overlapped with a space visually recognized by the user based on the position corrected by the correction unit.

2. The information processing apparatus according to claim 1,
wherein the correction unit corrects the position of the predetermined part in a vertical direction based on a reference height.

3. The information processing apparatus according to claim 1,
wherein the correction unit corrects the position of the predetermined part in a front-back direction of the user in a case where the angle of the inclination of the head from a horizontal state is out of a predetermined range.

4. The information processing apparatus according to claim 3,
wherein the correction unit corrects the position of the predetermined part in a backward direction of the user in a case where the head is inclined downward from the horizontal state.

5. The information processing apparatus according to claim 3,
wherein the correction unit corrects the position of the predetermined part in a forward direction of the user in a case where the head is inclined upward from the horizontal state.

6. The information processing apparatus according to claim 1, further comprising:
a display processing unit that changes a display mode of the image when the image is operated by the user.

7. The information processing apparatus according to claim 6,
wherein the display processing unit changes the display mode of the image according to an elapsed time from a start of an operation on the image by the user.

8. The information processing apparatus according to claim 6,
wherein the position processing unit estimates a position of a hand of the user,
the display control unit displays the image of the hand of the user to be overlapped with a space visually recognized by the user based on the position estimated by the position processing unit, and
the display processing unit changes the display mode of the image of the hand according to overlapping with the image operated by the user.

9. An information processing method comprising:
a position processing step of estimating a head position of a user and estimating a position of a predetermined part of a body of the user based on the estimated head position;
a correction step of correcting the position of the predetermined part estimated in the position processing step based on the head position and an angle of inclination of a head of the user; and
a display control step of executing processing of displaying an image operated by the user to be overlapped with a space visually recognized by the user based on the position corrected in the correction step.

10. A program causing a computer to execute:
a position processing step of estimating a head position of a user and estimating a position of a predetermined part of a body of the user based on the estimated head position;
a correction step of correcting the position of the predetermined part estimated in the position processing step based on the head position and an angle of inclination of a head of the user; and
a display control step of executing processing of displaying an image operated by the user to be overlapped with a space visually recognized by the user based on the position corrected in the correction step.

\* \* \* \* \*